United States Patent
Seaman et al.

(10) Patent No.: US 10,339,392 B2
(45) Date of Patent: Jul. 2, 2019

(54) METHOD AND SYSTEM FOR REAR STATUS DETECTION

(71) Applicant: BlackBerry Limited, Waterloo (CA)

(72) Inventors: Conrad Delbert Seaman, Ottawa (CA); Derek John Kuhn, Ottawa (CA); Stephen West, Manotick (CA)

(73) Assignee: BlackBerry Limited, Waterloo (CA)

( * ) Notice: Subject to any disclaimer, the term of this patent is extended or adjusted under 35 U.S.C. 154(b) by 36 days.

(21) Appl. No.: 15/624,289

(22) Filed: Jun. 15, 2017

(65) Prior Publication Data

US 2018/0365501 A1 Dec. 20, 2018

(51) Int. Cl.
| | |
|---|---|
| *G06K 9/00* | (2006.01) |
| *B60Q 9/00* | (2006.01) |
| *G01S 19/42* | (2010.01) |
| *G05D 1/02* | (2006.01) |
| *G06K 9/20* | (2006.01) |
| *G07C 5/00* | (2006.01) |
| *G01S 5/00* | (2006.01) |
| *G01S 5/02* | (2010.01) |

(52) U.S. Cl.
CPC ......... *G06K 9/00791* (2013.01); *B60Q 9/002* (2013.01); *G01S 5/0036* (2013.01); *G01S 5/02* (2013.01); *G01S 19/42* (2013.01); *G05D 1/0246* (2013.01); *G06K 9/209* (2013.01); *G07C 5/008* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,974,215 A | * | 11/1990 | Bolz | B60Q 1/48 367/108 |
| 5,940,012 A | * | 8/1999 | Studebaker | B60Q 9/007 180/167 |
| 6,400,266 B1 | | 6/2002 | Brown, Jr. | |
| 6,693,524 B1 | | 2/2004 | Payne | |
| 7,375,621 B1 | * | 5/2008 | Hines | B60Q 9/005 340/435 |
| 8,670,035 B2 | | 3/2014 | Robert | |
| 8,780,207 B2 | * | 7/2014 | Rumble | G01J 5/02 348/143 |
| 9,412,280 B1 | * | 8/2016 | Zwillinger | G08G 5/0069 |
| 9,488,984 B1 | * | 11/2016 | Williams | G05D 1/0274 |
| 2003/0174505 A1 | * | 9/2003 | Wainwright | B60Q 1/16 362/485 |

(Continued)

FOREIGN PATENT DOCUMENTS

EP 2474944 A1 7/2012

OTHER PUBLICATIONS

International Searching Authority, International Search Report and Written Opinion for International Application No. PCT/CA2018/050722, dated Sep. 5, 2018.

*Primary Examiner* — Shervin K Nakhjavan
(74) *Attorney, Agent, or Firm* — Moffat & Co (57) ABSTRACT

A method for identifying a loading bay at a facility to which a vehicle is reversing, the method including determining, at a sensor apparatus connected with the vehicle, that the vehicle is reversing; capturing an image of the loading bay; and determining, from the image, the loading bay at the facility to which the vehicle is reversing.

20 Claims, 9 Drawing Sheets

(56) References Cited

U.S. PATENT DOCUMENTS

| | | | | |
|---|---|---|---|---|
| 2005/0031169 | A1* | 2/2005 | Shulman | G01C 21/3647 382/104 |
| 2005/0192702 | A1* | 9/2005 | Moutsokapas | B65G 63/004 700/213 |
| 2005/0281436 | A1* | 12/2005 | Gehring | G06K 9/3241 382/104 |
| 2005/0285878 | A1* | 12/2005 | Singh | H04M 1/72544 345/633 |
| 2006/0132602 | A1* | 6/2006 | Muto | H04N 7/18 348/148 |
| 2006/0261164 | A1* | 11/2006 | Bochicchio | G01G 19/083 235/385 |
| 2006/0267745 | A1* | 11/2006 | Larson | B60D 1/36 340/431 |
| 2008/0018438 | A1 | 1/2008 | Ehrlich et al. | |
| 2009/0015400 | A1 | 1/2009 | Breed | |
| 2010/0265048 | A1 | 10/2010 | Lu et al. | |
| 2011/0143779 | A1* | 6/2011 | Rowe | G06Q 30/02 455/456.3 |
| 2011/0248818 | A1* | 10/2011 | Hashim-Waris | G06Q 30/0235 340/5.52 |
| 2012/0008865 | A1* | 1/2012 | Wu | G06K 9/3258 382/182 |
| 2012/0158256 | A1* | 6/2012 | Kuboyama | B62D 15/0275 701/51 |
| 2013/0116905 | A1 | 5/2013 | Lucking et al. | |
| 2013/0332004 | A1* | 12/2013 | Gompert | G07C 5/008 701/1 |
| 2015/0030304 | A1* | 1/2015 | Meads | H04N 21/4312 386/200 |
| 2015/0294166 | A1* | 10/2015 | Kuehnle | G06K 9/00805 701/70 |
| 2015/0302736 | A1* | 10/2015 | Geerlings | G08C 17/02 340/4.3 |
| 2015/0375947 | A1* | 12/2015 | Hochstein | B60Q 9/002 348/143 |
| 2016/0019497 | A1* | 1/2016 | Carvajal | G06Q 10/08 701/519 |
| 2016/0052453 | A1* | 2/2016 | Nalepka | B60R 1/00 348/148 |
| 2016/0088546 | A1* | 3/2016 | Birch | H04L 67/18 455/456.3 |
| 2016/0090072 | A1* | 3/2016 | Metz | B60T 17/22 188/1.11 E |
| 2016/0137128 | A1* | 5/2016 | Kim | B60R 1/00 348/148 |
| 2016/0171592 | A1* | 6/2016 | Pugh | G06Q 30/0635 705/26.81 |
| 2016/0297361 | A1* | 10/2016 | Drazan | H04N 7/181 |
| 2016/0355134 | A1 | 12/2016 | Leary | |
| 2016/0368456 | A1* | 12/2016 | Outwater | B60R 25/04 |
| 2017/0158131 | A1 | 6/2017 | Friebe | |
| 2017/0305694 | A1* | 10/2017 | McMurrough | G06T 7/10 |
| 2017/0368939 | A1* | 12/2017 | Brooks | B60K 35/00 |
| 2018/0097884 | A1* | 4/2018 | Terwilliger | H04L 67/12 |

* cited by examiner

METHOD AND SYSTEM FOR REAR STATUS DETECTION

FIELD OF THE DISCLOSURE

The present disclosure relates to vehicles, and in particular relates to rear status detection for vehicles.

BACKGROUND

When trailers are backed into loading bays, they face several challenges related to location and driver awareness. One problem occurs with the status of the doors on a truck or trailer. In particular, doors on the truck or trailer may not be secured properly and thus be only partially open. During reversing maneuvers, such unsecured doors may be damaged.

Further, it is sometimes desirable for fleet tracking purposes, cargo management purposes and/or facility management purposes to know the location of a vehicle or trailer. Knowing the location of the trailer or vehicle while it is backing up to a loading or unloading facility is sometimes problematic. Specifically, during the backing up into the loading bay, if an overhang exists over the loading bay, this may obscure GPS readings and make it impossible for the trailer to report its location.

Further, even without an overhang, loading bay doors are often very close together and therefore an accurate location of the trailer with regard to the particular loading bay that the trailer has backed into may not be readily apparent.

BRIEF DESCRIPTION OF THE DRAWINGS

The present disclosure will be better understood with reference to the drawings, in which.

DETAILED DESCRIPTION OF THE DRAWINGS

The present disclosure provides a method for identifying a loading bay at a facility to which a vehicle is reversing, the method comprising determining, at a sensor apparatus connected with the vehicle, that the vehicle is reversing; capturing an image of the loading bay; and determining, from the image, the loading bay at the facility to which the vehicle is reversing.

The present disclosure further provides a sensor apparatus connected with a vehicle configured for identifying a loading bay at a facility to which the vehicle is reversing, the sensor apparatus comprising: a processor; an image capture sensor; and a communications subsystem, wherein the sensor apparatus is configured to: determine that the vehicle is reversing; capture an image of the loading bay; and determine, from the image, the loading bay at the facility to which the vehicle is reversing.

The present disclosure further provides a computer readable medium for storing instruction code, which when executed by a processor on a sensor apparatus connected with a vehicle cause the sensor apparatus to identify a loading bay at a facility to which the vehicle is reversing, the instruction code configured to: determine that the vehicle is reversing; capture an image of the loading bay; and determine, from the image, the loading bay at the facility to which the vehicle is reversing.

In vehicle operations, sensor systems may be included on the vehicle and include a plurality of sensor apparatuses operating remotely from a central monitoring station to provide remote sensor data to a management or monitoring hub. For example, one sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, or that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus that is capable of providing data or information from sensors associated with the sensor apparatus to a central monitoring or control station. Sensors associated with the sensor apparatus may either be physically part of the sensor apparatus, for example a built-in global positioning system (GPS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses, and in some cases may have software to monitor such data and provide alerts to operators if data is outside of the predetermined boundaries.

Figure 1:
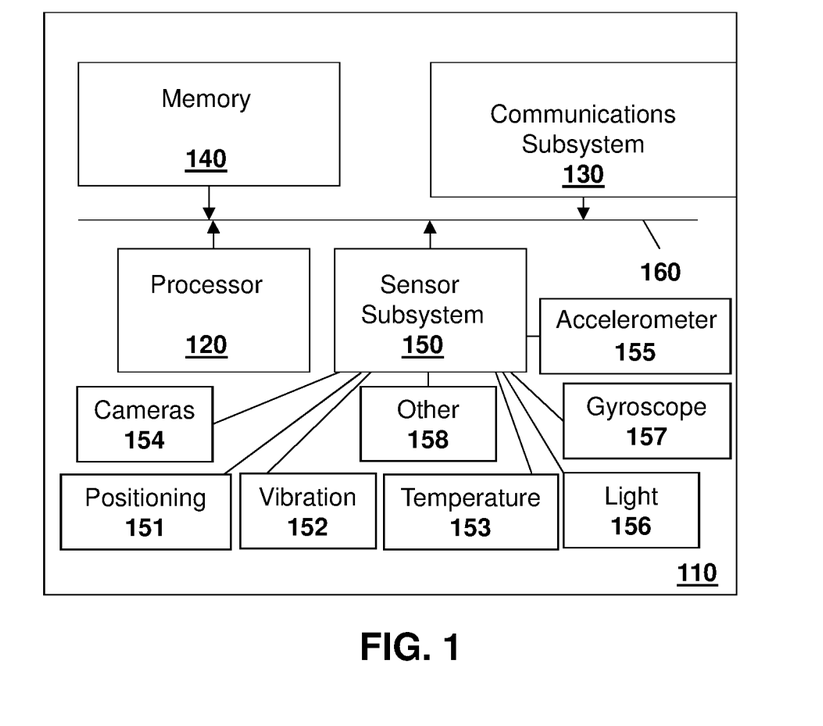
FIG. 1 is a block diagram of an example sensor apparatus for use with the embodiments of the present disclosure.

One sensor apparatus is shown with regard to FIG. 1. The sensor apparatus of FIG. 1 is however merely an example and other sensor apparatuses could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used.

Communications between the various elements of sensor apparatus 110 may be through an internal bus 160 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

In other cases, sensor apparatus 110 may be affixed to stationary objects including buildings, lamp posts, fences, cranes, among other options.

Such sensor apparatus 110 may be a power limited device. For example sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
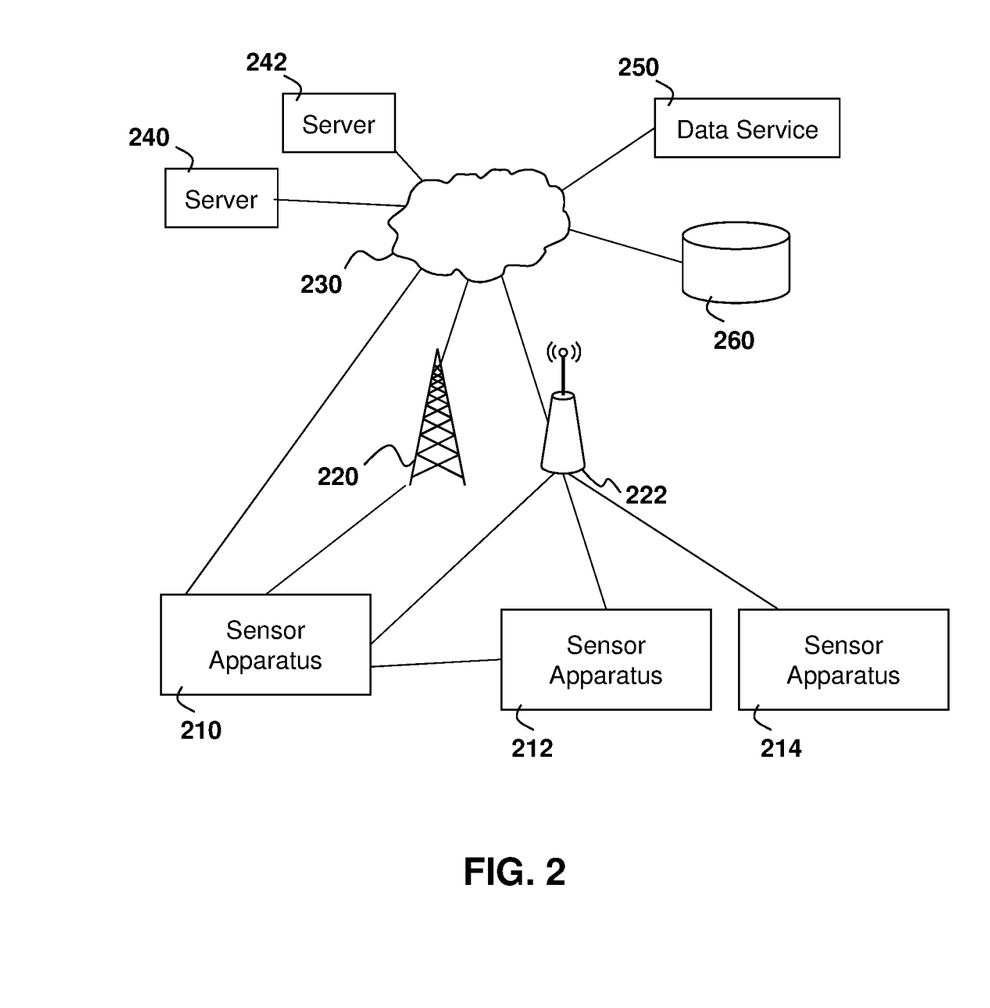
FIG. 2 is a block diagram showing an example environment for a sensor apparatus in accordance with the embodiments of the present disclosure.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with image capture apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a facilities management server, and direct loading and unloading of goods to vehicles in particular bays of the facility.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 or processing at those sensor apparatuses.

A sensor apparatus such as that described in FIGS. 1 and 2 above may be used for backing up of a trailer, shipping container or other vehicle. Various embodiments are provided below. In a first embodiment, a camera associated with the sensor apparatus may be used. However, in other embodiments low-power communication methods including BLE, ZigBee, near field communications, among other short-range wireless communications could be utilized, as described below.

In accordance with embodiments described below, a method and system is provided to provide accurate loading or unloading location information for trailers to improve yard management. Specifically, if the exact location for a trailer becomes known, a trailer yard becomes similar to an airport and the management of trailers into and out of the facility can be more efficiently done, for example through a central monitoring station.

Under normal operation, a trailer and a truck typically have unobstructed views of the sky to obtain accurate GPS location fixes. The embodiments described provide that when a truck is backing up, a second set of location management algorithms may be engaged to improve accuracy and safety. Such algorithms may assist an operator to avoid damage to the trailer or doors by providing alerts. Further, using such algorithms, location accuracy may be improved at loading bays.

Figure 3:
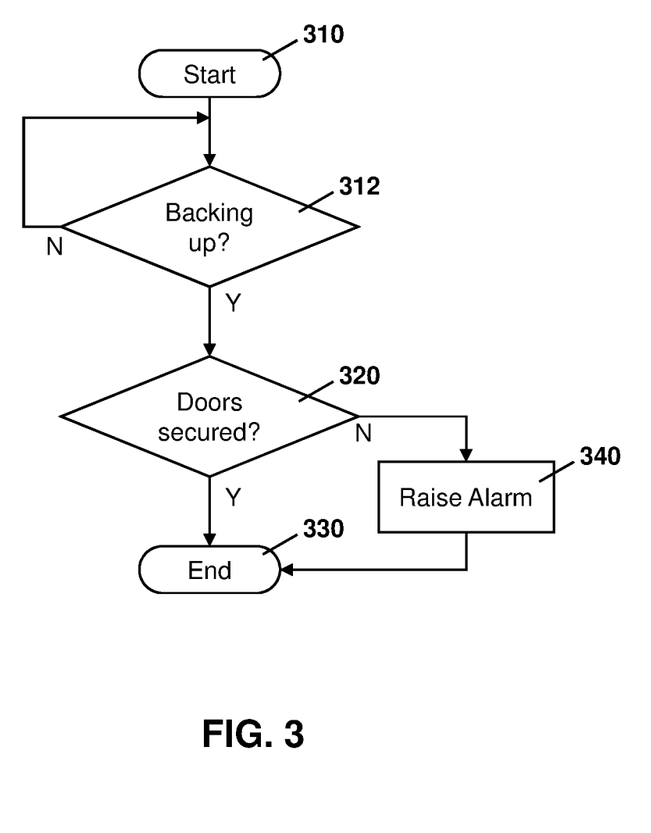
FIG. 3 is a process diagram showing a process to determine whether doors of a vehicle are secured.

Therefore, in accordance with a first embodiment of the present disclosure, a detection of whether a door is secured during backing up is provided. Reference is now made to FIG. 3.

The process of FIG. 3 starts at block 310 and proceeds to block 312, in which a check is made to determine whether or not the trailer is backing up. The check at block 312 may comprise various techniques. In a first embodiment, sensors may be located on the engine of the tractor pulling the trailer. In this case, when the engine is placed into reverse, the sensors may indicate to a controller or sensor apparatus that the trailer is backing up. In other embodiments, the trailer may know its orientation and utilize the GPS to determine whether or not it is backing up. In other embodiments, a sensor apparatus may have a camera which indicates that objects in the rear of the trailer are getting larger and therefore that the trailer is backing up. In other cases, the fact that the trailer has entered a geo-fenced area may indicate that the trailer is, or soon will be, backing up. Other options are possible.

If, at block 312, the check determines that the trailer is not backing up then the process proceeds to loop back to block 312 until a determination is made that the trailer is backing up.

Once a determination is made at block 312 that the trailer is backing up, the process proceeds to block 320 in which a check is made to determine whether the doors of the trailer are secured. In particular, the check at block 320 may be accomplished in various ways. In the first embodiment, sensors on the door may indicate if the doors are completely closed or are anchored in an open position. For example, in some embodiments, the design of a loading bay may necessitate the trailer reversing with the doors pinned to the side of the trailers in a fully open position. In other cases, the trailer should reverse with the doors fully closed.

Various sensors may be part of the doors or latching system or anchoring system which may provide feedback to a sensor apparatus to indicate that the doors are in such a position.

In other embodiments, a camera on the door may indicate whether the door is fully closed or fully open. For example, if the camera shows that the image of objects behind the trailer are not completely perpendicular to the direction of motion then the doors may not be fully closed. Similarly, if the objects on the side of the trailer are not moving parallel to the direction of motion, then the doors may not be in a fully open position. Various imaging processing software may be used to make the determination of whether the doors are fully open are fully closed.

In other embodiments, a camera may be mounted to the back of the trailer but above the doors. This camera may then be used to detect the position of the doors through image recognition.

Other options for the determination of whether the door is secured would be apparent to those skilled in the art having regard to the present disclosure.

From block 320, if the doors are secured then the process proceeds to block 330 and ends.

Conversely, if the doors are not secured and the vehicle is reversing, then the process proceeds from block 320 to block 340, in which an alarm is raised. The alarm at block 340 may, in one embodiment, be one or a combination of an audio, visual or sensory alarm within a cab of a tractor to alert the operator that the doors are not closed. In other embodiments, the alarm may be a signal to a central controller, which may then provide an alert, for example to the loading bay to which the trailer is being backed up, to allow visual or auditory indicators to be provided to the driver or loading bay staff. In other cases, a test or data notification to an in-cab solution or mobile phone may be made. Other options for alerts would be apparent to those skilled in the art having regard to the present disclosure.

Further, in some cases, in addition to an alarm, or instead of an alarm, a processor may take positive action to stop potential damage of the doors. This may include, for example, actuating or overriding braking functions on a vehicle to stop the motion of the vehicle and/or trailer. If the doors can be opened or closed electronically, the functionality may further include closing the doors or opening them fully.

From block 320, the process proceeds to block 330 and ends.

Thus, in accordance with the various embodiments of the present disclosure described above, a sensor apparatus on a vehicle may contain a camera or other sensors, including a gyroscope, time-of-flight (TOF), radar, light detection and ranging (LIDAR), among other options. This sensor apparatus may be used to determine if the door is open. If the door is open a series of potential alerts can be sent to the driver or loading bay operator to stop backing up in order to reduce potential door damage, or positive action may be taken without driver input.

In a further embodiment of the present disclosure, knowledge of the exact bay that a trailer is being reversed into may be desirable at a central station. Such knowledge may allow management of the loading or unloading of the trailer, provide end to end goods tracking at a more refined level, provide which bay the goods were loaded at and which bay the goods were unloaded at, provide for terminal management functionality, among other benefits.

However, it may be difficult to detect in the exact bay that a trailer is being backed into by merely using a GPS sensor on a sensor apparatus. In particular, loading bay doors are often located very close to each other and the level of granularity of the GPS system may not be sufficient to allow the exact determination of the loading bay that the truck or trailer is backing into. For example, in some cases GPS may only be accurate to 3 meters, 10 meters or even 100 meters depending on the quality of the position fix.

In other cases, loading bays are located under an overhang or other obstruction. In this case, the sky is obscured and a GPS fix may be impossible to obtain.

Therefore, in accordance with one embodiment of the present disclosure, a visual sensor on the rear of the trailer may be used to take photos or images of the loading bay that is being approached. Specifically, bay doors may, be labelled with a letter, number or code that is highly visible. Optical recognition of the image may then be used to determine which loading bay is being approached. In this case, the accurate location may be used with imperfect GPS location information to determine the exact bay that it is being backed into.

Figure 4:
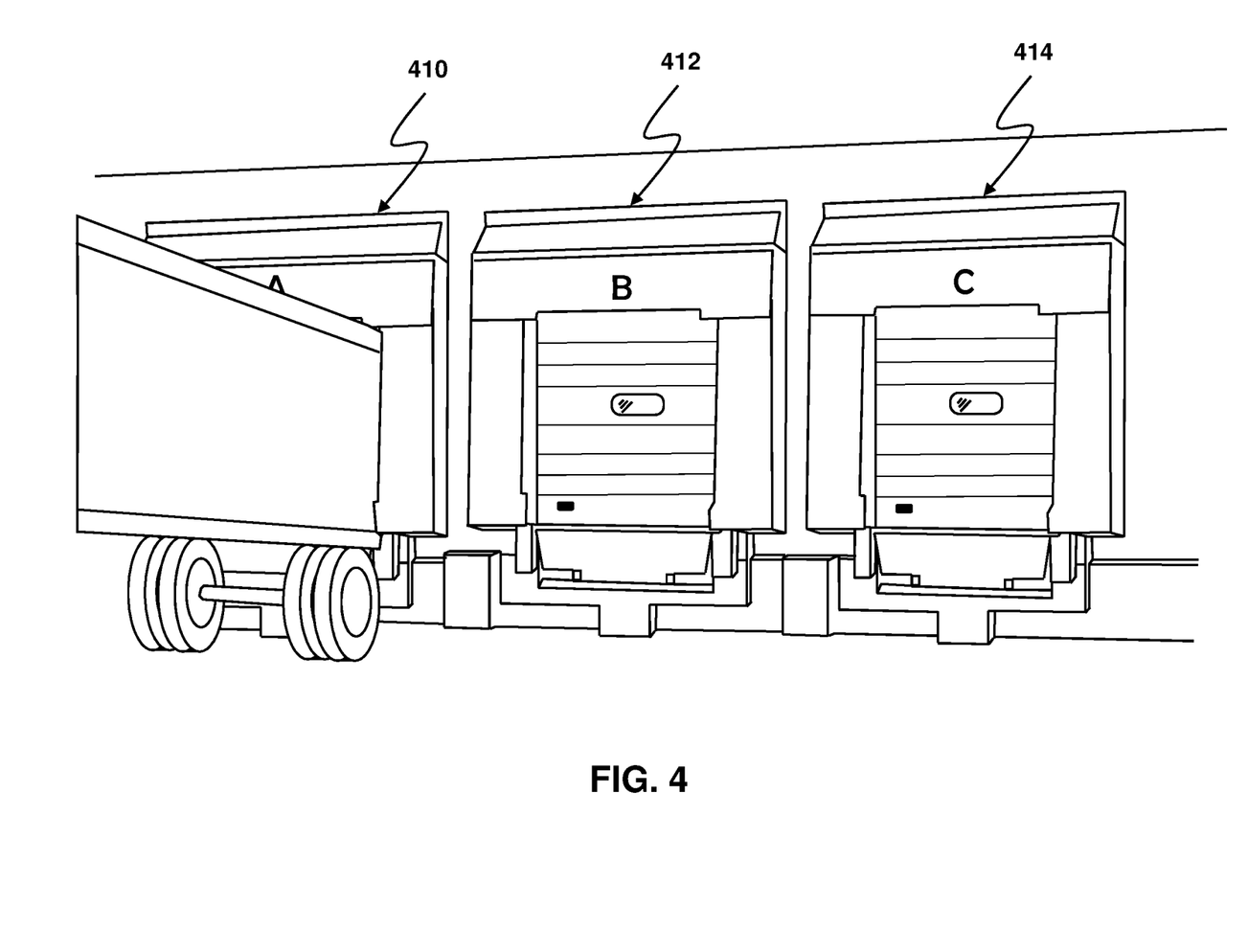
FIG. 4 is a perspective view of an example facility with three loading bays.

In particular, reference is now made to FIG. 4, which shows a perspective view of a facility having three loading bays. Such loading bays are labeled as loading bays 410, 412, and 414 in the embodiment of FIG. 4.

In the example of FIG. 4, a letter is placed on a canopy above each door, shown as letters A, B and C. The use of letters on a canopy however is only one example. In other cases, the door marking may be placed on the building, awning or on a canopy at any location, including above, at the sides or below a door. Further, the marking may be placed on the door itself in some embodiments.

The marking may be a letter, number or other code that could be detected and would be visible in an image of the door.

Figure 5:
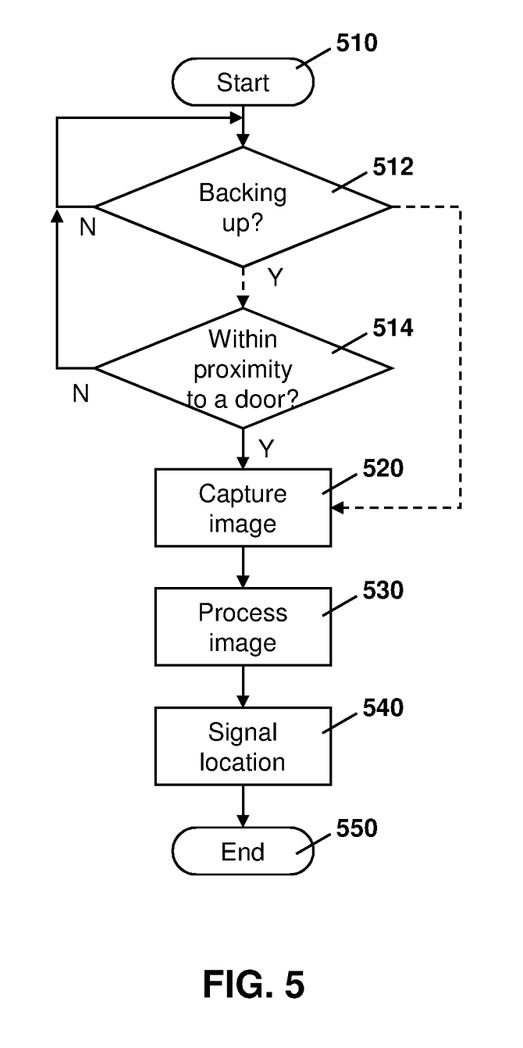
FIG. 5 is a process diagram showing a process for determining which loading bay a vehicle is backing into, where the processing is performed on a sensor apparatus.

Reference is now made to FIG. 5, which shows one process for the determination of a location at the sensor apparatus. In particular, the process of FIG. 5 starts at block 510 and proceeds to block 512 in which a determination is made as to whether the trailer or vehicle is backing up. The determination of block 512 may be done similarly to the determination made at block 312 above.

If the vehicle is not backing up, the process proceeds back to block 512 until a determination is made that the vehicles is backing up.

Once a determination is made that the vehicle is backing up, the process may optionally proceed to block 514. In block 514, a determination is made of whether the vehicle is within a threshold proximity to a bay door. This may be done, for example, through visual processing indicating that there is a bay door behind the trailer and that the trailer is within a certain distance of the day door. In particular, in some cases the trailer may be backing up for other reasons, including parking in a trailer yard, among other options. In this case the determination of a bay door is not relevant.

Further, in some cases the vehicle may not be able to back straight into a bay. For example, the backup path may involve turning the trailer during reversing. In this case, image capture while the bay door is not within a captured image may be irrelevant. Therefore, in the determination at block 514, if the vehicle is not within proximity to a bay door or not facing the door, then the process may proceed back to block 512 to determine whether or not the vehicle is continuing to backup.

Once the vehicle is within a proximity and visual range of the door, or if block 514 is omitted, the process proceeds to block 520 in which an image is captured. The image capture may occur, for example, utilizing a camera sensor on the trailer. However, in other embodiments the camera sensor may be located on the tractor with a view behind the vehicle. The camera may be part of the sensor apparatus or may be communicating with the sensor apparatus in some embodiments.

Once the image is captured, in accordance with the embodiment of FIG. 5, the sensor apparatus may process the image at block 530. The processing of the image may utilize any image processing techniques including symbol detection to detect the symbol around the bay door. Alternatively, the sensor apparatus may send the image to a server for processing, and as discussed herein, processing steps may be performed at the sensor apparatus and/or a server system.

Further, in some cases supplementary information may be used to assist the image processing. For example, information such as the location of the vehicle may be utilized to focus the image processing. Specifically, the sensor apparatus, through sensors on a trailer, may know at least a rough estimate of the location of the trailer. and therefore may know the facility that it is at. Supplemental information may further include information such as the orientation of the trailer, a tilt angle of the trailer, other images recently captured by the image capture device, among other supplemental information. The use of such information may be beneficial in image processing to narrow the possible bay doors that the trailer may be at. Supplemental information may further include a map overlay of information relating to the specific location and identification of bay doors on a more general purpose map. Such supplemental information may be used to allow the image processing to locate the bay markings. For example, the facility may have bay markings on the left of the bay door, and the marking may be numbers. Knowledge of such information may allow for better accuracy in identifying the bay. Other examples of supplementary information may include a last position fix for the vehicle, stored information regarding types of markings on loading bays at the facility, stored information regarding location of markings on loading bays at the facility, physical characteristics of the facility, a bearing the loading bay is facing.

In other cases, if the facility is not known, data from the image may be compared with data stored locally or in a remote database. In this case, a lookup may be performed based on information within the image, such as the type of marking, the location of marking, facility color, whether the bay doors include a canopy or awning, whether the driveway is paved, among other information that may assist the image processing.

The information about the facility may be stored at the sensor apparatus, or may be obtained from a remote store.

In some cases, no supplementary information is available, and the image processing at block 530 relies solely on the image captured at block 520.

Any symbol recognition software or algorithm may be utilized to facilitate the image processing at block 530. In some embodiments, user input may assist such image processing.

Based on the processing at block 530, a bay is identified and the process proceeds to block 540. At block 540 the identification of the bay into which the trailer is reversing is sent/signaled/transmitted to a central location. The signaling at block 540 is however optional. In some cases, instead of signaling, the information may be stored on the sensor apparatus for later processing. Other options are possible.

From block 540 the process proceeds to block 550 and ends.

Figure 6:
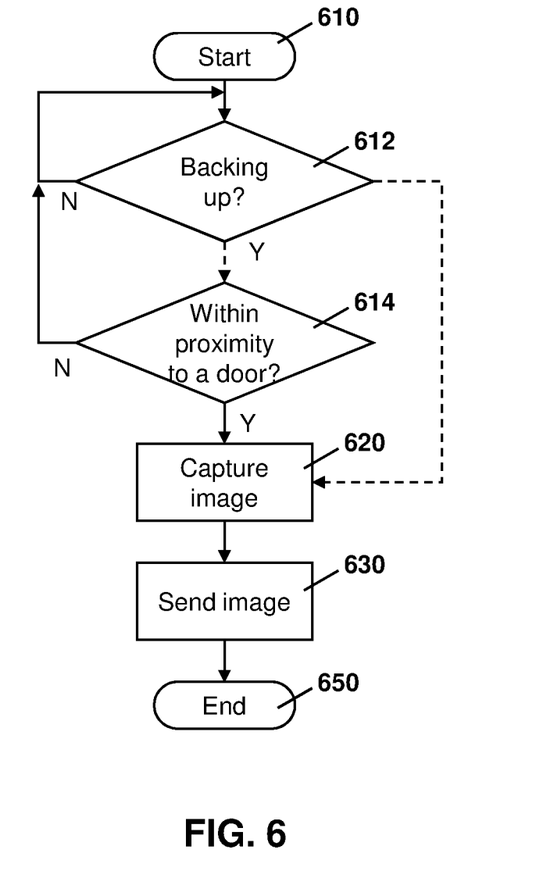
FIG. 6 is a process diagram showing a process for determining which loading bay a vehicle is backing into, where the processing is performed at a server.

In other embodiments, the image processing may occur at a remote location. Reference is now made to FIG. 6.

In the embodiment of FIG. 6, a sensor apparatus on the vehicle starts the process at block 610 and proceeds to block 612 in which a determination is made of whether the trailer or truck or vehicle is backing up. Such determination is similar to the determinations made at blocks 312 and 512 described above.

The process may then optionally proceed to block 614 in which a determination is made whether the trailer is within a proximity and visual range of the loading bay. This is similar to the process described above with regard to block 514 above.

From block 614, the process proceeds to block 620 in which an image of the loading bay door that the trailer or vehicle is backing into is captured.

From block 620 the process proceeds to block 630 in which image is transmitted to a central server. In particular, the image data may comprise one or more pictures or may comprise a video of the trailer backing into the loading bay.

The image data may, in some embodiments, have other supplemental information included. Such supplemental information may include location data for the last position fix of the trailer, which may be utilized to narrow the potential locations that the trailer is backing into. Supplemental information may further include information such as the orientation of the trailer, a tilt angle of the trailer, other images recently captured by the image capture device, among other supplemental information.

From block 630 the process proceeds to block 650 and ends.

Figure 7:
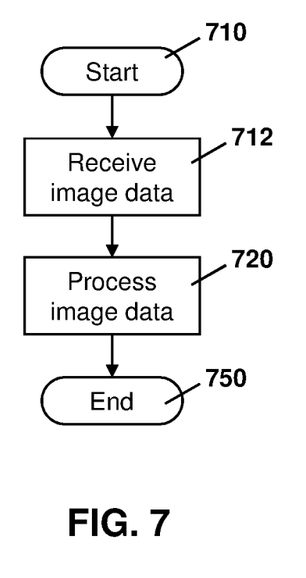
FIG. 7 is a process diagram showing a process for determining which loading bay a vehicle is backing into performed at a server.

Referring to FIG. 7, on the central monitoring side the process starts at block 710 and proceeds to block 712. At block 712, the central server receives the image data, which may in some embodiments include supplemental data such as location data sent by a trailer.

The process then proceeds to block 720 in which the image is processed. Such processing may in some embodiments involve deriving information from the image. For example, through a database at the central monitoring station or accessible to the central monitoring station, a lookup may be performed based on information within the image, such as the type of marking, the location of marking, facility color, whether the bay doors include a canopy or awning, whether the driveway is paved, among other information that may assist the image processing.

The processing at block 720 may further use information that was sent in conjunction with the image data, such as the last position fix from the vehicle, previous image data, identity of the sensor apparatus unit, or other such information to further facilitate the processing.

The processing at block 720 allows a bay that the trailer is backed into to be determined. This information may be stored or associated with the particular trailer for future use. It may also be used by management or coordination software for the particular facility to enable operations or optimize the facility utilization at the particular loading bay facility.

The process then proceeds to block 750 and ends.

In still further embodiments, instead of using visual data, other sensor data may be utilized to determine which bay the vehicle is backing into. For example, short range communications may be utilized to provide information on the bay that the vehicle is backing into.

Figure 8:
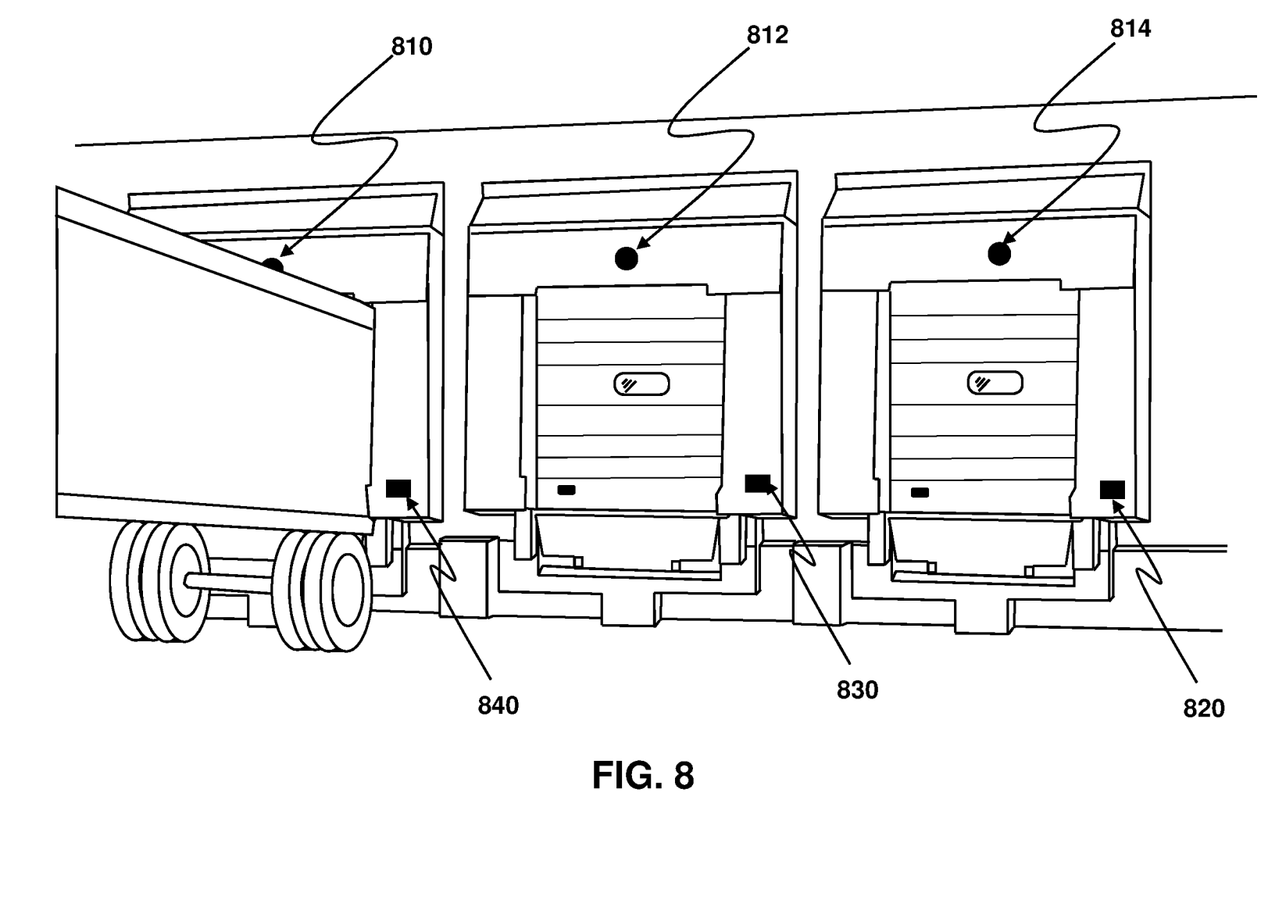
FIG. 8 is a perspective view of an example facility with three loading bays having electronic signals to provide identification of the loading bays.

Reference is now made to FIG. 8 which shows a perspective view of an example loading bay facility having three loading bays.

In the embodiment of FIG. 8, short range communications transmitters 810, 812 and 814 are placed above each loading bay door. For example, such sensors may be short range wireless transmitters such as Wi-Fi, Bluetooth™, BLE, ZigBee, near field communication, among other options. However, in other embodiments, the transmitters may be placed at other locations relative to the loading bays.

A sensor apparatus on a trailer may look for the signals transmitted by transmitters 810, 812 and 814 and determine which signal is the strongest. Based on the strength indicator, the sensor apparatus on the trailer may know which is the closest transmitter and therefore which bay the trailer has backed into.

Specifically, in one embodiment, transmitter 812 may be a Bluetooth™ Low Energy transmitter in which a preamble or other signal characteristic is different from the preambles or signal characteristics from transmitter 810 and 814.

Transmitters 810, 812 and 814 may be calibrated to provide the same power level when transmitting. Alternatively, the transmitters at a location may be fingerprinted, or otherwise characterized for later processing. For example, certain transmitters may be stronger or less powerful than others. Knowing this information, the sensor apparatus may understand that each location has a particular profile and that adjustments can be applied. Moreover, the system may feed back information about a location to be analyzed and sent back to other devices that may happen upon the location. The profiles/fingerprints for locations may be stored at a server and sent to the sensor apparatus. If a destination for a sensor apparatus is determined, then profiles for that location may be sent to the sensor apparatus before, en route, or after arrival. Alternatively, the sensor apparatus may request a location's profile.

Therefore, a sensor on the trailer may detect signals from the three transmitters but determine that the signal from transmitter 814 is the strongest. The sensor may therefore read the preamble from the transmitter 812 and report that this signal was received with the strongest signal power level to a central controller.

Figure 9:
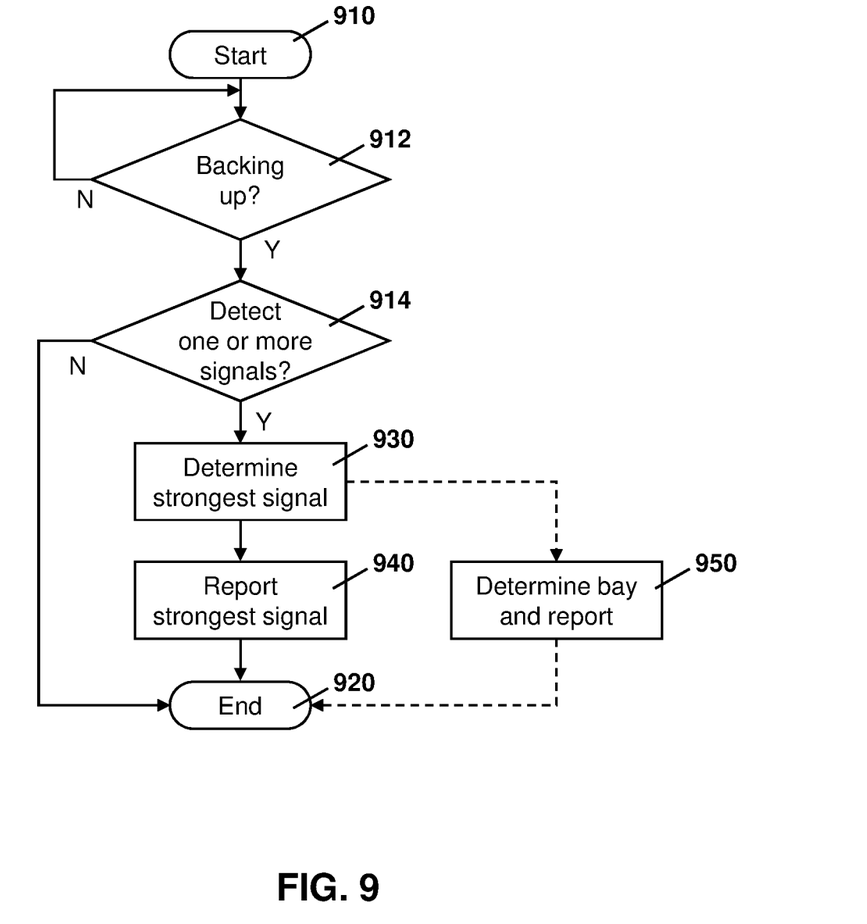
FIG. 9 is a process diagram showing a process for determining which loading bay a vehicle is backing into using the electronic signals from FIG. 8.

Reference is now made to FIG. 9. In particular, the process of FIG. 9 starts at block 910 and proceeds to block 912 in which a determination is made that the trailer is backing up. Such determination is similar to the determination made in blocks 312, 512, and 612 above.

From block 912 the process proceeds to block 914 in which a determination is made whether the trailer detects one or more signals from a bay. Thus, if the trailer is not backing into a facility that includes wireless communications to indicate bay doors, the detection at block 914 may not exist. Therefore, if no signal is detected the process proceeds to block 920 and ends.

If one or more location signals are detected at block 914 then the process proceeds to block 930 in which a strongest signal is determined.

From block 930 the process may proceed to block 940 in one embodiment, in which the strongest signal and information from within that signal is reported to a central monitoring station. Alternatively, the process may proceed from block 930 to block 950 in which the determination of the bay is made at the sensor apparatus and the particular bay that the trailer is backing into is then reported at block 950.

From blocks 940 or 950 the process proceeds to block 920 and ends.

Referring again to FIG. 8, in some embodiments, a low-range transmitter such as transmitters 820, 830 and 840 may exist. Such low-range transmitters may only have a range of a few centimeters, inches, meters or feet. In this case, a corresponding sensor on the trailer may be located in a position that, when the trailer is close enough to transmitters 820, 830 or 840, the sensor apparatus can detect such transmitters and report that it is close to that particular bay. In this case, the distance the transmitter can be detected may be smaller than the width of the bay door, and thus only the transmitter on the bay door that the trailer is reversing into is detected.

Therefore in accordance with the embodiments of FIGS. 8 and 9, instead of a camera, a low-power local network such as BLE, ZigBee, Wi-Fi, Bluetooth™, near field communications, or other radiofrequency identification may be used to determine the bay at which the vehicle is now parked. The cost of installing such small transmitter devices used to broadcast the door name or identity and its GPS location may be low in many cases.

The information provided based on the location could therefore substitute inaccurate GPS location information and provide for the accurate determination of which loading bay the trailer has backed into. Again, such information may be utilized by a central controller or an operations management controller for a particular facility in order to optimize operations, provide end-to-end tracking of goods, or be used with other factors which may be useful for the shipping or trailer industry.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Except where otherwise described as such, a server, central server, service, processing service, endpoint, Uniform Resource Identifier (URI), Uniform Resource Locator (URL), back-end, and/or processing system may be used interchangeably in the descriptions and examples herein. Mesh networks and processing may also be used alone or in conjunction with other types as well as fog computing. Moreover, communication may be from device to device, wherein they may use low power communication (e.g., Bluetooth, Wi-Fi), and/or a network, to communicate with other devices to get information.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for identifying a loading bay at a facility to which a vehicle is reversing, the method comprising:
   determining, at a sensor apparatus connected with the vehicle, that the vehicle is reversing;
   capturing, at the sensor apparatus, an image of the loading bay; and
   determining, from the image, an identity of the loading bay at the facility to which the vehicle is reversing.

2. The method of claim 1, wherein the determining the identity of the loading bay comprises processing the image.

3. The method of claim 2, wherein the processing comprises using image recognition to identify at least one marking on the loading bay.

4. The method of claim 3, wherein the at least one marking is selected from the group consisting of letters, numbers or code.

5. The method of claim 2, wherein the processing further comprises utilizing supplementary information during the processing.

6. The method of claim 2, further comprising sending results of the processing to a server.

7. The method of claim 1, wherein the determining the identity of the loading bay comprises sending the image to a server.

8. The method of claim 7, wherein the sending the image further comprises sending supplementary information along with the image.

9. The method of claim 1, further comprising determining a location of the vehicle based on the determined loading bay.

10. A sensor apparatus connected with a vehicle configured for identifying a loading bay at a facility to which the vehicle is reversing, the sensor apparatus comprising:
    a processor;
    an image capture sensor; and
    a communications subsystem,
    wherein the sensor apparatus is configured to:
       determine that the vehicle is reversing;
       capture an image of the loading bay; and
       determine, from the image, an identity of the loading bay at the facility to which the vehicle is reversing.

11. The sensor apparatus of claim 10, wherein the sensor apparatus is further configured to determine the identity of the loading bay by:
    processing the image at the sensor apparatus; and
    signaling results of the processing to a server.

12. The sensor apparatus of claim 11, wherein the sensor apparatus is further configured to process by using image recognition to identify at least one marking on the loading bay.

13. The sensor apparatus of claim 12, wherein the at least one marking is selected from the group consisting of letters, numbers or code.

14. The sensor apparatus of claim 11, wherein the sensor apparatus is further configured to process by utilizing supplementary information during the processing.

15. The sensor apparatus of claim 12, wherein the supplementary information includes at least one information element selected from the group of: a last position fix for the vehicle; stored information regarding types of markings on loading bays at the facility; stored information regarding location of markings on loading bays at the facility; physical characteristics of the facility; or a bearing the loading bay is facing.

16. The sensor apparatus of claim 10, wherein the sensor apparatus is further configured to determine the identity of the loading bay by sending the image to a server.

17. The sensor apparatus of claim 16, wherein the sending the image further comprises sending supplementary information along with the image.

18. The sensor apparatus of claim 17, wherein the supplementary information includes at least one information element selected from the group of: a last position fix for the vehicle; stored information regarding types of markings on loading bays at the facility; stored information regarding location of markings on loading bays at the facility; physical characteristics of the facility; or a bearing the loading bay is facing.

19. The sensor apparatus of claim 10, wherein the sensor apparatus is further configured to determine a location of the vehicle based on the determined loading bay.

20. A non-transitory computer readable medium for storing instruction code, which when executed by a processor on a sensor apparatus connected with a vehicle cause the sensor apparatus to identify a loading bay at a facility to which the vehicle is reversing, the instruction code configured to:
- determine that the vehicle is reversing;
- capture an image of the loading bay; and
- determine, from the image, an identity of the loading bay at the facility to which the vehicle is reversing.

* * * * *